US011208284B2

(12) United States Patent
Kitauchi et al.

(10) Patent No.: US 11,208,284 B2
(45) Date of Patent: Dec. 28, 2021

(54) PAPER SHEET HANDLING DEVICE, AUTOMATIC TRANSACTION DEVICE, AND PAPER SHEET HANDLING METHOD

(71) Applicant: HITACHI-OMRON TERMINAL SOLUTIONS, CORP., Tokyo (JP)

(72) Inventors: Daisuke Kitauchi, Tokyo (JP); Tooru Miyasaka, Tokyo (JP); Junji Fujita, Tokyo (JP)

(73) Assignee: HITACHI-OMRON TERMINAL SOLUTIONS, CORP., Tokyo (JP)

( * ) Notice: Subject to any disclaimer, the term of this patent is extended or adjusted under 35 U.S.C. 154(b) by 388 days.

(21) Appl. No.: 16/318,499

(22) PCT Filed: May 10, 2017

(86) PCT No.: PCT/JP2017/017729

§ 371 (c)(1),
(2) Date: Jan. 17, 2019

(87) PCT Pub. No.: WO2018/047408

PCT Pub. Date: Mar. 15, 2018

(65) Prior Publication Data

US 2019/0284002 A1 Sep. 19, 2019

(30) Foreign Application Priority Data

Sep. 12, 2016 (JP) ............................ JP2016-177230

(51) Int. Cl.
*G06Q 40/00* (2012.01)
*G07D 11/00* (2019.01)
(Continued)

(52) U.S. Cl.
CPC ............... *B65H 20/36* (2013.01); *B65H 7/18* (2013.01); *G07D 9/00* (2013.01); *G07D 11/50* (2019.01);
(Continued)

(58) Field of Classification Search
CPC .. B65H 20/36; B65H 7/18; B65H 2701/1912; B65H 2404/632; B65H 2513/42;
(Continued)

(56) References Cited

U.S. PATENT DOCUMENTS 4,739,156 A * 4/1988 Watanabe .............. G07D 11/10 235/379
4,772,781 A * 9/1988 Watanabe ............ G07D 11/237 235/379
(Continued)

FOREIGN PATENT DOCUMENTS

| | | |
|---|---|---|
| JP | 06-211418 A | 8/1994 |
| JP | 08-087638 A | 4/1996 |
| JP | 08-231082 A | 9/1996 |

OTHER PUBLICATIONS

Description JPH06211418A, machine translation, May 4, 2021, pp. 1-7 (Year: 2021).*
(Continued)

*Primary Examiner* — Tuyen K Vo
(74) *Attorney, Agent, or Firm* — Mattingly & Malur, PC

(57) ABSTRACT

A banknote handling device is provided with which it is possible to constantly demonstrate sufficient device processing performance, and which prevents collisions between a transportation direction switching means and a banknote even when the operation speed of the transportation direction switching means changes. Accordingly, a paper sheet handling device for handling a plurality of paper sheets and switching the transportation direction includes: a transportation path for transporting at least one paper sheet and a transportation direction switching means for switching the direction of transportation of the paper sheet; and a paper sheet handling control means for controlling, in accordance with the constantly-changing operation speed of the transportation direction switching means, at least one of the
(Continued)

operation timing of the transportation direction switching means, the speed of transportation of a paper sheet, and the distance between a paper sheet and a preceding paper sheet.

6 Claims, 6 Drawing Sheets

(51) Int. Cl.
*G07F 19/00* (2006.01)
*B65H 20/36* (2006.01)
*G07D 11/50* (2019.01)
*B65H 7/18* (2006.01)
*G07D 9/00* (2006.01)
*G07D 13/00* (2006.01)

(52) U.S. Cl.
CPC ..... *G07D 13/00* (2013.01); *B65H 2701/1912* (2013.01); *G07D 2201/00* (2013.01); *G07D 2211/00* (2013.01)

(58) Field of Classification Search
CPC ........ B65H 2511/40; B65H 7/02; B65H 5/26; B65H 5/062; G07D 11/50; G07D 9/00; G07D 13/00; G07D 2201/00; G07D 2211/00; G07D 11/235; G07D 11/16; G07D 11/28; G07D 11/18
USPC .......................................................... 235/379
See application file for complete search history.

(56) References Cited

U.S. PATENT DOCUMENTS

| | | | | | |
|---|---|---|---|---|---|
| 5,626,822 | A * | 5/1997 | Kadowaki | A61L 2/04 | 422/307 |
| 6,422,458 | B1 * | 7/2002 | Katou | B65H 1/025 | 235/379 |
| 2005/0006458 | A1 * | 1/2005 | Wanibe | G07D 11/25 | 235/379 |
| 2010/0090397 | A1 * | 4/2010 | Taniguchi | B65H 29/58 | 271/303 |
| 2010/0213661 | A1 * | 8/2010 | Fukazawa | B65H 29/60 | 271/3.19 |
| 2010/0219580 | A1 * | 9/2010 | Hamasaki | B65H 29/12 | 271/265.01 |
| 2011/0133395 | A1 * | 6/2011 | Taniguchi | B65H 29/006 | 271/225 |
| 2015/0136562 | A1 * | 5/2015 | Fujita | G07D 11/16 | 194/206 |
| 2018/0257884 | A1 * | 9/2018 | Yokawa | B65H 29/006 | |

OTHER PUBLICATIONS

International Search Report of PCT/JP2017/017729 dated Aug. 15, 2017.

* cited by examiner

[Fig. 1]
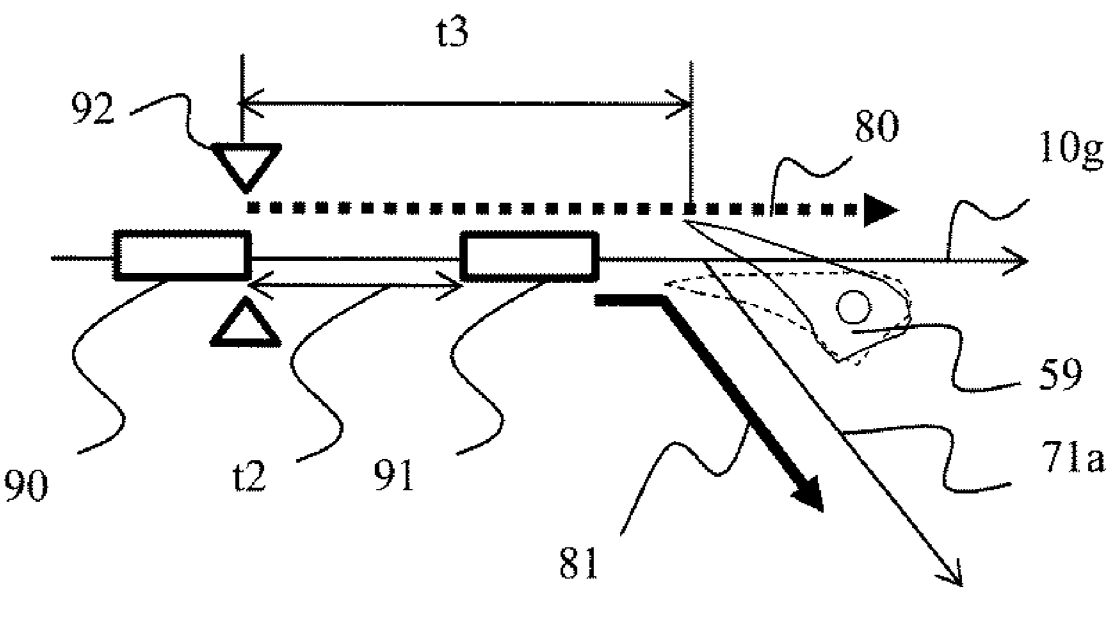

[Fig. 2]
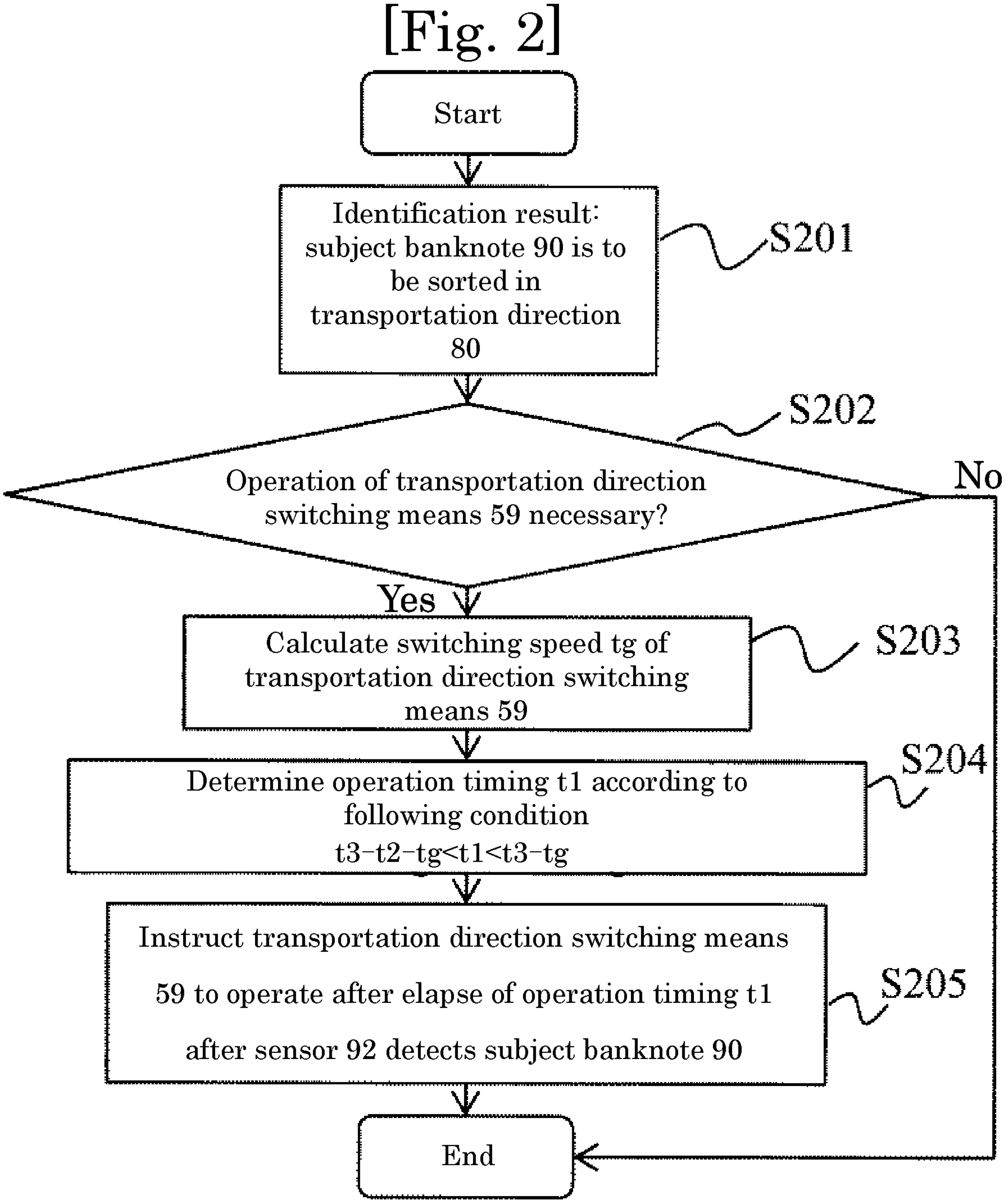

[Fig. 3]
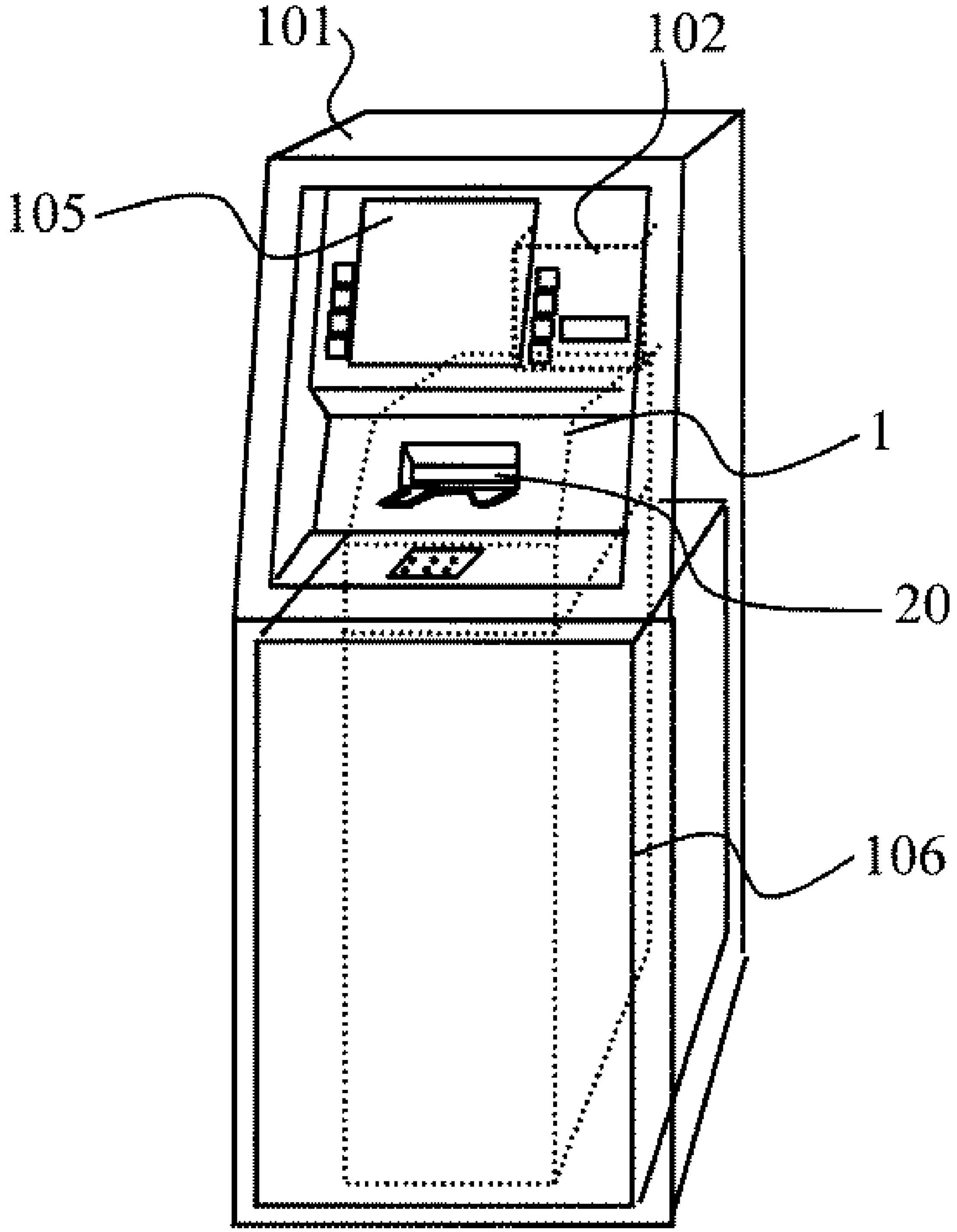

[Fig. 4]
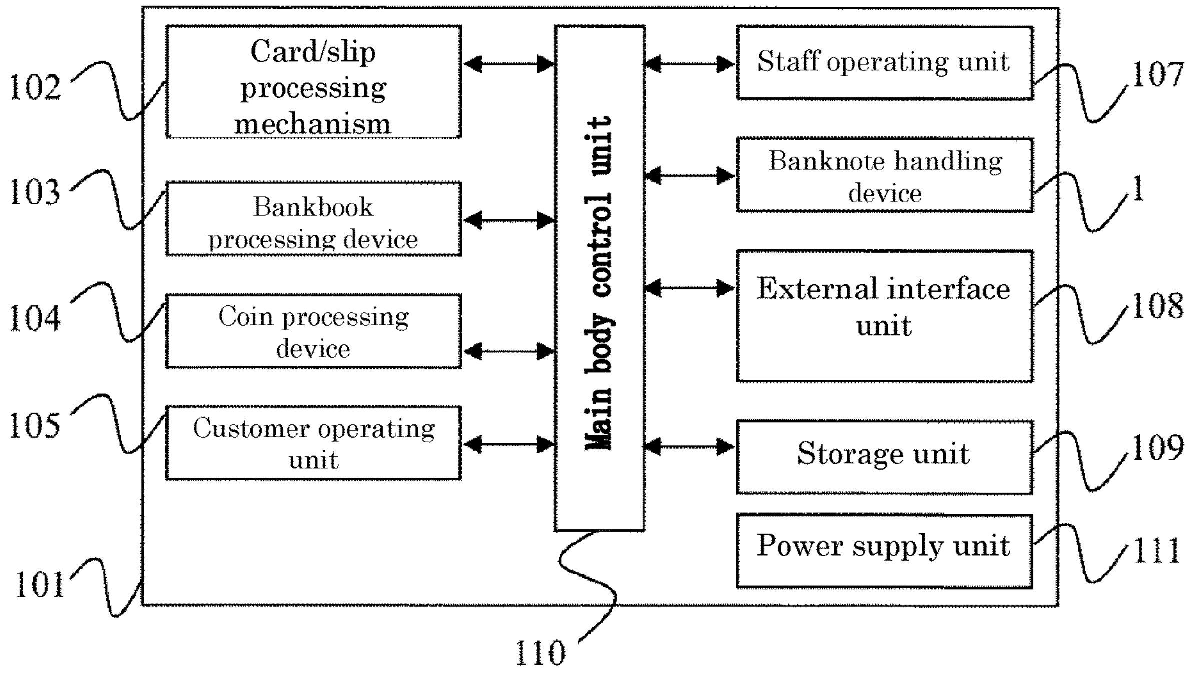
[Fig. 5]
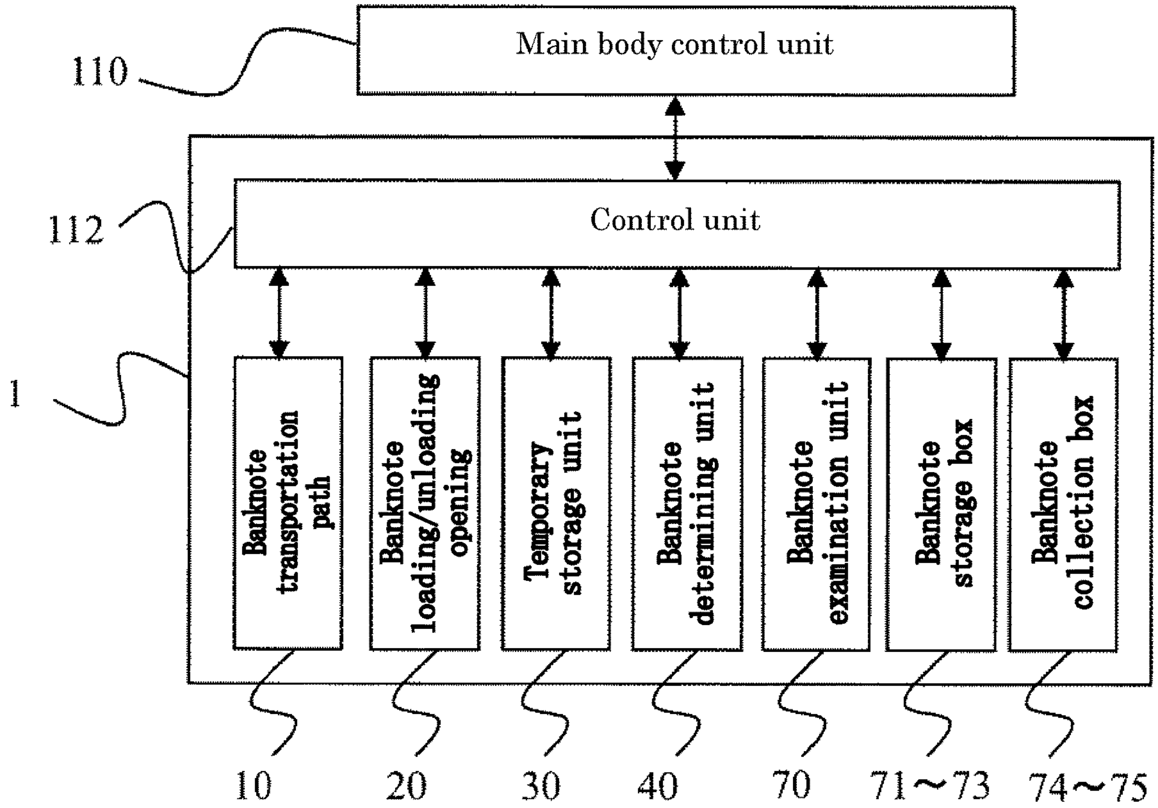

[Fig.6]
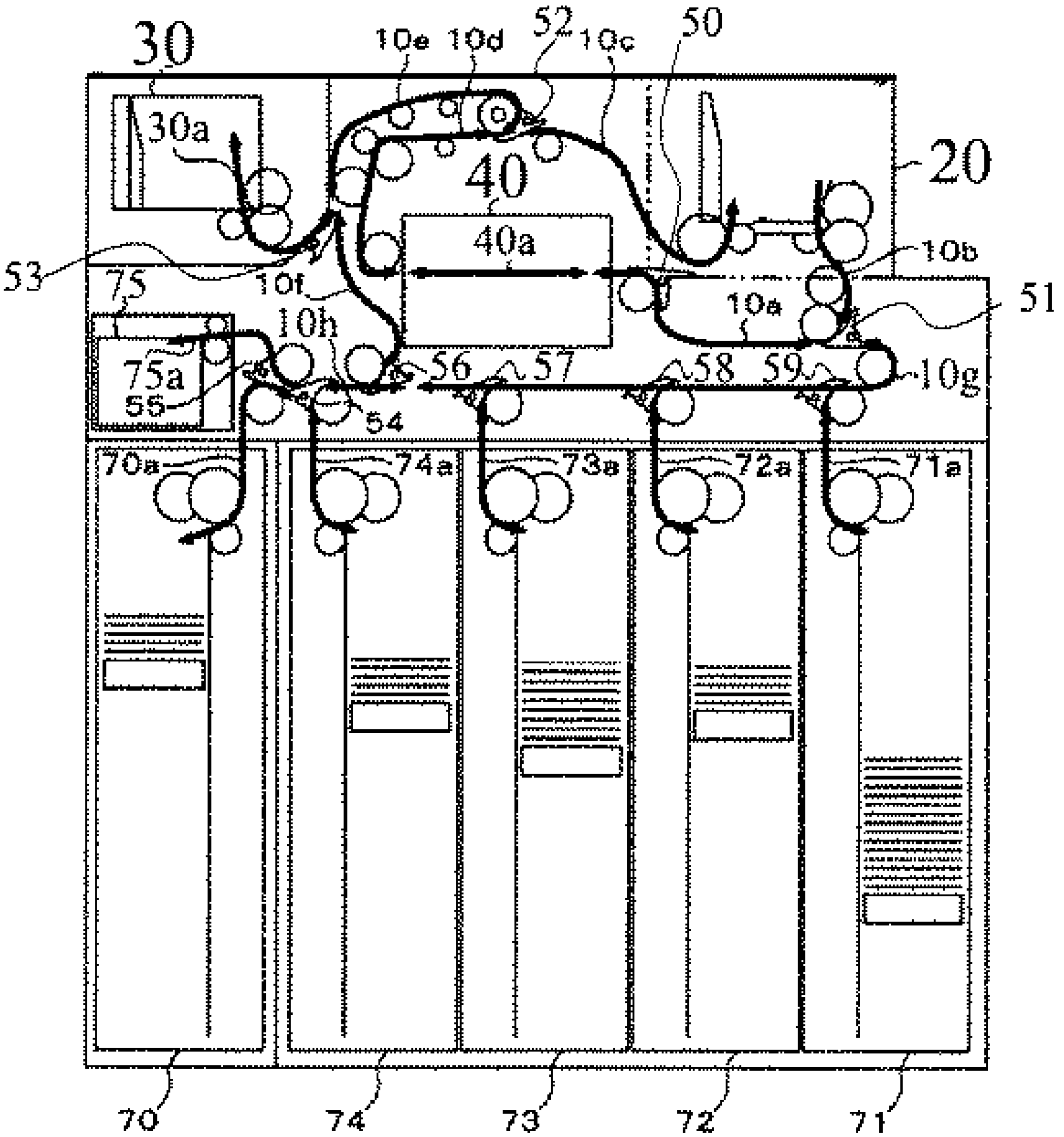

[Fig. 7]
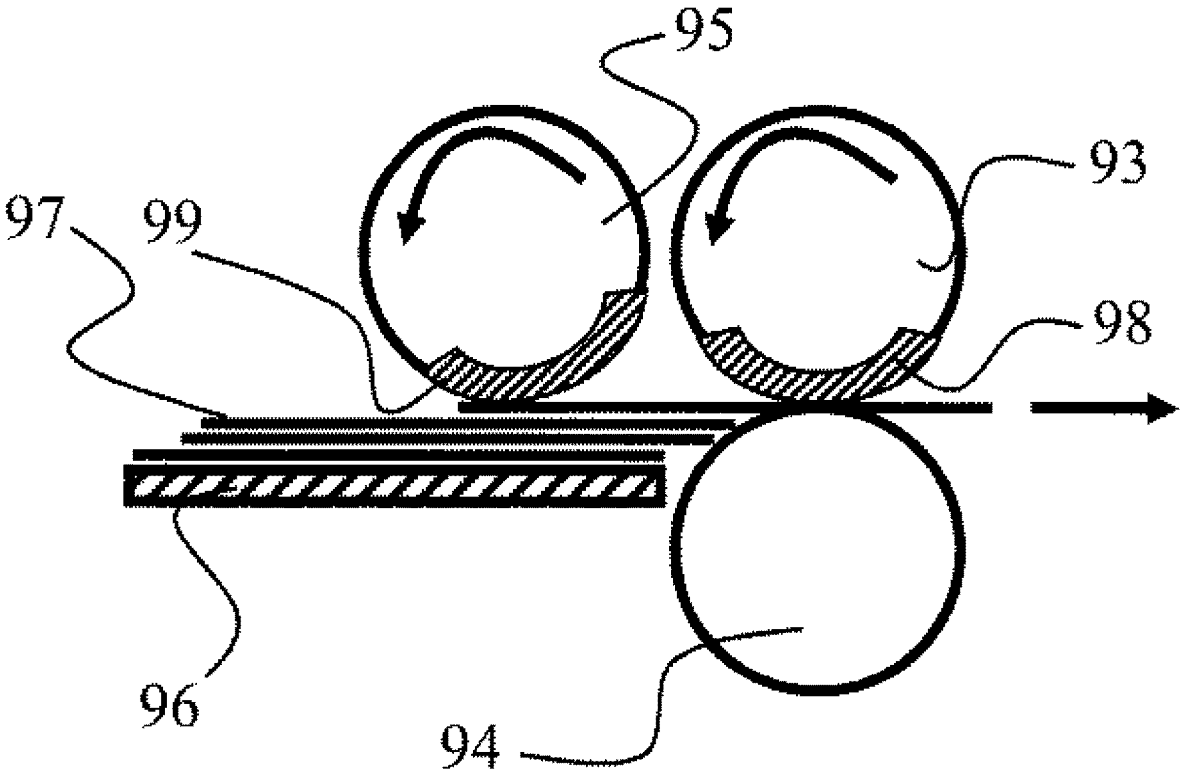

PAPER SHEET HANDLING DEVICE, AUTOMATIC TRANSACTION DEVICE, AND PAPER SHEET HANDLING METHOD

TECHNICAL FIELD

The present invention relates to a paper sheet handling device, an automatic transaction device, and a paper sheet handling method.

BACKGROUND ART

Generally, banknotes as an example of paper sheets are stored at different locations of a paper sheet handling device depending on a kind and a state. Therefore, the paper sheet handling device includes a transportation direction switching means (a transportation direction switching mechanism) for changing a transportation destination depending on the kind and the state.

In such a device, the transportation direction switching means is operated at a timing after the elapse of a predetermined period on the basis of the output of a sheet sensor disposed as a front stage of the transportation direction switching means. The transportation direction switching means is operated to sort paper sheets after a certain period (fixed data) is elapsed after the sheet sensor detects a leading end of a paper sheet as a timing of operating the transportation direction switching means. In this sorting operation, it is necessary to switch the transportation destination so that a paper sheet does not collide with the transportation direction switching means. In such a device, since it is necessary to process a large number of paper sheets, there is a high demand for increasing the number of paper sheets processed per unit time. It is necessary to shorten the interval in order to increase the number of paper sheets processed per unit time.

In order to increase the number of paper sheets processed per unit time and shorten the interval, it is possible to prevent collision between a paper sheet and the transportation direction switching means even when the interval is changed due to change in the transportation speed by the control of changing the timing of operating the transportation direction switching means according to the transportation speed. Such a technology is disclosed in Japanese Patent Application Publication No. H08-87638, for example.

CITATION LIST

Patent Literature

[PTL 1] Japanese Patent Application Publication No. H08-87638

SUMMARY OF INVENTION

Technical Problem

However, in the conventional technology, since switching control of the transportation direction is performed assuming that the operation speed of the transportation direction switching means does not change, when the operation speed of the transportation direction switching means changes, the paper sheet may collide with the transportation direction switching means. For example, when the operation speed of the transportation direction switching means increases, a preceding paper sheet may collide with the transportation direction switching means. On the other hand, the operation speed of the transportation direction switching means decreases, the paper sheet may collide with the transportation direction switching means. As a countermeasure against collision, the interval may be set large by taking change in the operation speed of the transportation direction switching means into consideration. However, when the set interval is larger than necessary, there is a problem that the device cannot exhibit its sufficient processing performance and the number of paper sheets processed per unit time decreases.

An object of the present invention is to provide a paper sheet handling device, an automatic transaction device, and a paper sheet handling method capable of providing a sufficient processing performance and preventing collision between a transportation direction switching means and a paper sheet even when an operation speed of the transportation direction switching means changes.

Solution to Problem

In order to attain the object, the present invention provides a paper sheet handling device including: a transportation path along which a paper sheet is transported; a transportation direction switching mechanism that selectively switches a transportation direction in the transportation path; and a paper sheet handling control unit that changes and controls at least one of an operation timing of the transportation direction switching mechanism, a transportation speed of the paper sheet, and a distance between the paper sheet and a preceding paper sheet according to an operation speed of the transportation direction switching mechanism.

Alternatively, the object is attained by providing a paper sheet handling device that handles a plurality of paper sheets and switches a transportation direction, the paper sheet handling device including: a transportation path along which at least one paper sheet is transported; a transportation direction switching mechanism that switches a transportation direction of the paper sheet; and a paper sheet handling control unit that controls at least one of an operation timing of the transportation direction switching mechanism, a transportation speed of the paper sheet, and a distance between the paper sheet and a preceding paper sheet according to a constantly-changing operation speed of the transportation direction switching mechanism.

The object is attained by the paper sheet handling device including means for measuring the operation speed of the transportation direction switching means.

The object is attained by the paper sheet handling device including a banknote feeding mechanism capable of controlling a banknote interval using the paper sheet as a banknote.

The object is attained by the paper sheet handling device including an operation panel with which a user can select whether an operation mode of the transportation direction switching mechanism, a transportation speed of the paper sheet, or a distance between the paper sheets will be controlled.

Advantageous Effects of Invention

According to the present invention, it is possible to provide a sufficient processing performance and prevent collision between a transportation direction switching means and a paper sheet even when an operation speed of the transportation direction switching means changes.

BRIEF DESCRIPTION OF DRAWINGS

FIG. 1 is a schematic diagram for describing a transportation direction switching operation of a transportation direction switching means as an embodiment of the present invention.

FIG. 2 is a flowchart of a transportation direction switching operation of a transportation direction switching means as an embodiment of the present invention.

FIG. 3 is an external perspective view of an automatic transaction device as an embodiment of the present invention.

FIG. 4 is a control block diagram illustrating a control relation of the automatic transaction device as an embodiment of the present invention.

FIG. 5 is a control block diagram illustrating a control relation of a banknote handling device as an embodiment of the present invention.

FIG. 6 is a side view illustrating a configuration of a banknote handling device as an embodiment of the present invention.

FIG. 7 is a perspective view illustrating a schematic configuration of a banknote feeding mechanism as an embodiment of the present invention.

DESCRIPTION OF EMBODIMENTS

Hereinafter, an embodiment of the present invention will be described with reference to the drawings.

Embodiment 1

FIG. 3 is a perspective view illustrating an external view of an automatic transaction device according to an embodiment of the present invention. In the present embodiment, although an automatic transaction device that handles banknotes is described as an example, the present invention can be naturally applied to a device that handles paper sheets other than banknotes.

An automatic transaction device 101 illustrated in the drawing is configured to store banknotes deposited (loaded) from users therein and dispense (unload) banknotes stored therein to users and includes a banknote handling device 1, a safe casing 106, a banknote loading/unloading opening 20, a customer operating unit 105, and a card/slip processing mechanism 102.

The banknote handling device 1 processes banknotes. Banknote storage boxes 71 to 73 and banknote collection boxes 74 and 75 which are not illustrated and in which banknotes are stored are provided in a lower part of the banknote handling device 1 and are surrounded by the safe casing 106.

An opening is formed in the banknote loading/unloading opening 10 so that users load and unload banknotes, and a mechanism that processes banknotes loaded and unloaded is provided inside the banknote loading/unloading opening 10.

The customer operating unit 105 is configured to display and input the details of translations and is provided on the left side in the upper part of the automatic transaction device 101.

The card/slip processing mechanism 102 is configured to process a card of a user and print and unload a transmit slip and is provided on the right side inside the upper part of the automatic transaction device 101.

Although not illustrated in FIG. 3, some automatic transaction device 101 may include a bankbook processing device 103 that processes bankbooks and a coin processing device 104 that processes coins.

FIG. 4 is a control block diagram of the automatic transaction device 101.

The card/slip processing mechanism, 102, the bankbook processing device 103, the coin processing device 104, the customer operating unit 105, a staff operating unit 107, the banknote handling device 1, an external interface unit 108 that transmits and receives data to and from an external device, a storage unit 109 that stores basic information of each device, programs, and the like, a main body control unit 110 that controls these respective units, and a power supply unit 111 that supplies electric power to the respective units are installed in the automatic transaction device 101.

FIG. 5 is a control block diagram illustrating a control relation of the banknote handling device 1.

A control unit 112 of the banknote handling device 1 is connected to the main body control unit 110 of the automatic transaction device 101 via a circuit and performs control according to a command from the main body control unit 110. Moreover, the control unit 112 transmits the state of the banknote handling device 1 to the main body control unit 110 and performs control of respective units according to transaction processing of the banknote handling device 1. Furthermore, the control unit 112 controls motors, solenoids, and the like of a banknote transportation path 10 that connects the respective components of the banknote handling device 1 to transport banknotes, the banknote loading/unloading opening 20 through which banknotes are loaded and unloaded, a temporary storage unit 30 that temporarily stores loaded banknotes until a transaction is closed, a banknote determining unit 40 that determines the type and the genuineness of a banknote, the banknote storage boxes 71 to 73 that stores loaded banknotes according to a banknote type and unloads the banknotes at the time of dispensing, a banknote examination unit 70 that stores banknotes from the banknote storage boxes 71 to 73 temporarily during examination and unloads the banknotes to the banknote storage boxes 71 to 73 again, and banknote collection boxes 74 and 75 that banknotes which are not handled as banknotes to be dispensed and banknotes that a customer forgets picking up.

FIG. 6 is a side view illustrating a configuration of the banknote handling device 1.

The banknote loading/unloading opening 20 through which a user loads and unloads banknotes is disposed on a front side (the upper right side in FIG. 6) of the upper part of the banknote handling device 1. The banknote determining unit 40 that determines banknotes is disposed at the central part, and the temporary storage unit 30 that temporarily stores banknotes loaded by users until a transaction is closed is disposed on an upper stage of the rear part. The banknote collection box 75 for storing banknotes which are not handled as banknotes to be dispensed and banknotes that a customer forgets picking up is disposed on a lower side of the temporary storage unit 30. These respective mechanism units are connected by a bidirectional transportation path. Here, the banknote determining unit 40 can determine the type and the genuineness of banknotes transported from the front side to the rear side and banknotes transported from the rear side to the front side. That is, the banknote determining unit 40 can determine the type and the genuineness of banknotes transported bidirectionally and determine whether a banknote is to be rejected or not.

In the lower part of the banknote handling device 1, the banknote storage boxes 71 to 73 that stores banknotes according to a banknote type, the banknote collection box 74 for storing banknotes which are not handled as banknotes to be dispensed and banknotes that a customer forgets picking up, and the banknote examination unit 70 functioning as a banknote loading unit that loads and collects banknotes to the banknote storage boxes 71 to 73 are disposed in that order from the front side toward the rear surface. Banknote transportation paths 70*a* to 74*a* are formed to pass through the doorways of the banknote examination unit 70, the banknote storage boxes 71 to 73, and the banknote collection box 74.

Transportation paths 10*a* to 10*h*, 30*a*, 40*a*, and 75*a* are transportation paths for transporting banknotes, and the directions of arrows indicate the directions for transporting banknotes.

Transportation direction switching means 50 to 59 (also referred to as transportation direction switching mechanisms) according to the present invention are disposed in merging sections of the respective transportation paths and are switched appropriately to change the transportation destination of banknotes.

Next, "automatic examination" in which it is necessary to process a number of banknotes continuously and which is a basic operation of the banknote handling device 1 will be described with reference to FIG. 6.

"Automatic examination" is an operation of checking the amount of cash stored in the banknote handling device 1. In order to check the amount of cash stored in the banknote handling device 1, the banknotes in the banknote storage box 71 are separated one by one and are passed through the transportation paths 71*a*, 10*g*, 10*a*, 40*a*, 10*d*, 10*e*, 10*f*, 10*h*, and 70*a* sequentially and are stored in the empty banknote examination unit 70.

Subsequently, the banknotes stored in the banknote examination unit 70 are separated one by one and are transported in a reverse order through the transportation paths and are stored in the banknote storage box 71. In this case, the banknote determining unit 40 disposed in the midway of the transportation path determines the banknote type and the number of banknotes to determine the amount of cash stored in the banknote storage box 71. After that, similar operations are performed with respect to the banknote storage boxes 72 and 73 to determine the amount of cash stored in all banknote storage boxes whereby the amount of cash stored in the banknote handling device 1 is checked.

During these operations, banknotes that the banknote determining unit 40 has determined that it is not possible to determine the banknote type and the banknotes are not suitable for use are transported to and collected in the banknote collection boxes 74 and 75 by the transportation direction switching means 54, 55, and 59 switching the transportation path.

Next, a transportation direction switching operation according to the present invention will be described.

FIG. 1 is a schematic diagram for describing a switching operation of the transportation direction switching means 59. FIG. 2 is a flowchart of a switching operation of the transportation direction switching means 59. In the "automatic examination", an operation of sorting a subject banknote 90 in a transportation direction 80 and sorting a preceding banknote 91 in a transportation direction 81 according to the results of the banknote determining unit 40 when banknotes stored in the banknote examination unit 70 are stored in the banknote storage box 71 will be described as an example.

The flowchart of FIG. 2 assumes that the preceding banknote 91 is sorted to the transportation path 71*a*, and the same is applied to when the subject banknote 90 is sorted in the transportation direction 81 and the preceding banknote 91 is sorted in the transportation direction 80. The flowchart of FIG. 2 can be also applied to the transportation direction switching means 50, 51, 52, 53, 54, 55, 56, 57, and 58 other than the transportation direction switching means 59 and can be also applied to operations other than "automatic examination".

The transportation direction switching means 59 includes a control unit (a paper sheet handling control unit) and operates according to the flowchart of FIG. 2. The control unit (the paper sheet handling control unit) may be provided outside the transportation direction switching means 59.

Here, the transportation direction switching means 59 is configured to operate by driving of a solenoid, for example, and operates with a time lag until a current rises, for example, after an operation command is received. That is, actually, the transportation direction switching means 59 operates with a predetermined delay (switching speed tg) after an operation command is issued.

First, the banknote determining unit 40 determines that the subject banknote 90 is to be transported in the transportation direction 80, and as illustrated in FIG. 1, the transportation direction switching means 59 faces the transportation direction 81 as indicated by a solid line in FIG. 1. In this state, the control unit of the transportation direction switching means 59 identifies (obtains an identification result) that the subject banknote 90 is sorted in the transportation direction 80 in S201.

Subsequently, on the basis of the determination in the banknote determining unit 40 that the subject banknote 90 is transported in the transportation direction 80, in S202, the control unit of the transportation direction switching means 59 determines whether an operation of the transportation direction switching means 59 is necessary according to a control signal of the control unit 112. The flow ends ("END") when the operation is not necessary, and the flow proceeds to S203 when the operation is necessary.

The control unit of the transportation direction switching means 59 determines the switching speed tg of the transportation direction switching means 59 in S203. In this case, when a banknote interval between the subject banknote 90 and the preceding banknote 91 is S and the transportation speed is V, it is necessary to operate the transportation direction switching means 59 in the transportation direction 80 in time t2 (=S/V). That is, the control unit of the transportation direction switching means 59 calculates the time t2 (=S/V) from the banknote interval S and the transportation speed V.

The sheet sensor 92, which detects the subject banknote 90, is disposed in a position a distance L or, in terms of the transportation speed V, time t3 (=L/V) apart from the gate. That is, the control unit of the transportation direction switching means 59 calculates the time t3 (=L/V) from the distance L and the transportation speed V.

Specifically, how the switching speed tg of the transportation direction switching means 59 that is to be operated thereafter will be described. The transportation direction switching means is driven by a solenoid. The switching speed tg may vary due to individual differences between solenoids, an increase in temperature of the solenoid itself, and aging of the solenoid or the transportation direction switching means. As for variations in the switching speed tg resulting from these reasons, the past switching speed tg and the past operation pattern may be stored in advance, and statistical processing may be performed on the stored contents whereby a present switching speed tg is predicted.

Since a variation in the switching speed tg due to individual differences between solenoids themselves is determined by initial characteristics of the solenoid, the switching speed can be predicted from the past switching speed tg.

As for a variation in the switching speed tg resulting from an increase in the temperature of the solenoid itself, since the increasing tendency of the temperature of a solenoid is associated with an energization time of the solenoid per unit time and the relation between the temperature of the solenoid and the switching speed tg is known, the switching speed can be predicted from the past switching speed tg and the past operation pattern. Moreover, a sensor for measuring the temperature of a solenoid may be provided and the switching speed tg may be predicted on the basis of the sensor output. In this configuration, the prediction accuracy of the switching speed tg is improved.

As for a variation in the switching speed tg resulting from aging of the solenoid or the transportation direction switching means, since the performance changes slowly over a long period of time, the switching speed can be predicted from the past switching speed tg.

Moreover, means such as a cooling fan for preventing an increase in temperature of the solenoid may be provided. With this configuration, it is possible to prevent an increase in temperature of the solenoid and to suppress a variation in the switching speed tg resulting from an increase in temperature of the solenoid.

Either one of two or more solenoid may be selected every operation as a driving source of the transportation direction switching means. In this configuration, since an increase in temperature of the solenoid can be suppress better than when only one solenoid is used, it is possible to suppress a variation in the switching speed tg.

Subsequently, the control unit of the transportation direction switching means 59 determines an operation timing t1 in S204.

Specifically, a method of controlling the operation timing t1 will be described.

First, a condition that the transportation direction switching means 59 does not collide with the preceding banknote 91 is as follows.

$$t3-tg>t1$$

A condition that the transportation direction switching means 59 does not collide with the subject banknote 90 is as follows.

$$t3-tg-t2<t1$$

That is, the operation timing t1 is determined so that the following condition is satisfied.

$$t3-tg-t2<t1<t3-tg$$

s described above, the transportation direction switching means 59 selects the operation timing t1 arbitrarily so that the above-described inequality is satisfied. The logics to be described later may be added functionally to the control unit of the transportation direction switching means 59 to determine the operation timing t1.

For example, when it is predicted that the switching speed tg is 60 ms under t2=20 ms and t3=100 ms, since t3−tg=40 ms and t3−tg−t2=20 ms, t1 may be set so that 20 ms<t1<40 ms is satisfied. When t1 is set to 30 ms, an equal margin can be secured for collision between the transportation direction switching means 59 and the subject banknote 90 and collision between the transportation direction switching means 59 and the preceding banknote 91. When t1 is set to a value close to 20 ms, a larger margin can be secured for collision between the transportation direction switching means 59 and the subject banknote 90. When t1 is set to a value close to 40 ms, a larger margin can be secured for collision between the transportation direction switching means 59 and the preceding banknote 91.

When it is predicted that the switching speed tg is 50 ms, t1 may be set so that 30 ms<t1<50 ms is satisfied. Moreover, when it is predicted that the switching speed tg is 70 ms, t1 may be set so that 10 ms<t1<30 ms is satisfied. Furthermore, when it is predicted that the switching speed tg is 120 ms, it is determined that the transportation direction switching means 59 collides with the subject banknote 90 if the transportation direction switching means 59 is driven and switching of the transportation direction is stopped. When collision between the transportation direction switching means and a banknote occurs, it is necessary to stop operation of the device in order to remove banknotes and repair the device, and the number of banknotes processed per unit time decreases. With this operation, it is possible to prevent collision between the transportation direction switching means and the banknote and to prevent a decrease in the number of banknotes processed per unit time.

By operating the transportation direction switching means 59 after the set operation timing t1 is elapsed from the subject banknote 90 is detected by the sensor 92, the transportation direction switching means 59 can switch the transportation direction without colliding with the subject banknote 90 and the preceding banknote 91.

The actual switching speed tg of the transportation direction switching means is measured by a speed measurement sensor such as an encoder. When driving of a solenoid starts, a current rises. When the transportation direction switching means starts moving, the current falls due to a change in inductance of the solenoid. When the transportation direction switching means stops, since the inductance does not change, the current starts rising again. This change in current may be measured by a current sensor such as a hall current sensor, and the time elapsed until the current starts rising again after the driving of the solenoid starts may be uses as the actual switching speed tg of the transportation direction switching means.

The measured switching speed tg is stored in the main body control unit 110 or the control unit 112 and is used for estimating the switching speed tg of the transportation direction switching means 59 which is to be operated thereafter.

Since the method of controlling the operation timing t1 does not impose any load on banknotes, banknotes are not damaged.

Subsequently, in S205, the control unit of the transportation direction switching means 59 detects the subject banknote 90 with the aid of the sensor 92 using the operation timing t1 determined in this manner and executes an operation of instructing the transportation direction switching means 59 to operate after the elapse of the operation timing t1. After that, the flow ends ("END").

As an alternative example of the flowchart of FIG. 2, an operation of the transportation direction switching means 59 will be described. Different portions will be mainly described and portions which are not described are the same as described above.

A method of controlling the transportation speed V will be described.

A condition that the transportation direction switching means 59 does not collide with the subject banknote 90 and the preceding banknote 91 is expressed as follows using the transportation speed V.

$$L/V-tg-S/V<t1<L/V-tg$$

The transportation speed V is determined so that this condition is satisfied.

For example, when it is predicted that the switching speed tg is 60 ms under S=200 mm, L=1000 mm, and t1=30 ms, if V=10 mm/ms, the following relation is satisfied.

$$20\ \text{ms} < t1 = 30\ \text{ms} < 40\ \text{ms}$$

Therefore, the transportation direction switching means 59 can be switched without any collision.

Moreover, when it is predicted that the switching speed tg is 50 ms, when the transportation direction switching means 59 is operated at V=11 mm/ms, the following relation is satisfied.

$$22.7\ \text{ms} < t1 = 30\ \text{ms} < 40.9\ \text{ms}$$

Therefore, the transportation direction switching means 59 can be switched without any collision.

Moreover, when it is predicted that the switching speed tg is 70 ms, when the transportation direction switching means 59 is operated at V=9 mm/ms, the following relation is satisfied.

$$18.9\ \text{ms} < t1 = 30\ \text{ms} < 41.1\ \text{ms}$$

Therefore, the transportation direction switching means 59 can be switched without any collision.

In the method of controlling the transportation speed V, even when it is predicted that the switching speed tg is 120 ms, if the transportation direction switching means 59 is operated at V=6 mm/ms, the following relation is satisfied.

$$13.3\ \text{ms} < t1 = 30\ \text{ms} < 46.7\ \text{ms}$$

Therefore, the transportation direction switching means 59 can be switched without any collision. Even when the switching speed is decreased greatly, since it is not necessary to stop switching the transportation direction and it is possible to sort banknotes in a proper direction, it is possible to prevent sorting errors.

Next, a method of controlling the banknote interval S will be described.

A unit that has a function of feeding banknotes includes a banknote feeding mechanism illustrated in FIG. 7, for example. A pressing plate 96 is pressed against a pickup roller 95 to generate frictional force, and a rubber pad 99 having a high frictional coefficient moves whereby banknotes are fed toward the right side in the drawing. A rubber pad 98 having a high frictional coefficient is also formed in a portion, in which feeding force should be applied to a banknote, of a feed roller 93 for the purpose of feeding banknotes. On the other hand, a gate roller 94 does not rotate in a feeding direction and stops the second and subsequent banknotes. With this mechanism, banknotes are fed one by one when the feed roller 93 makes one turn. Therefore, when the switching speed tg decreases, the rotation speed of the feed roller 93 is decreased to increase the banknote interval S. When the switching speed tg increases, the rotation speed of the feed roller 93 is increased to increase the banknote interval S.

According to the method of controlling the banknote interval S, when the rotation speed of the feed roller 93 is decreased, the number of banknotes processed per unit time decreases temporarily. However, since a variation in the switching speed tg resulting from an increase in temperature of the solenoid itself can be decreased by controlling an energization time of the solenoid in a long-term continuous operation mode, it is possible to increase the number of banknotes processed per unit time.

The staff operating unit 107 may have a function of selecting a method to be used among the three methods including the method of controlling the operation timing t1, the method of controlling the transportation speed V, and the method of controlling the banknote interval S. With this configuration, it is possible to cope with the purpose of use, the use environment, a banknote state, and the like and to reflect the intention of users.

As described above, it is possible to provide a banknote handling device capable of constantly providing a sufficient processing performance of the device and preventing collision between a transportation direction switching means and a banknote even when an operation speed of the transportation direction switching means varies by controlling at least one of an operation timing of the transportation direction switching means, the transportation speed of a paper sheet, and the distance between a paper sheet and a preceding paper sheet according to an operation speed of the transportation direction switching means.

REFERENCE SIGNS LIST

1 Banknote handling device
20 Banknote loading/unloading opening
30 Temporary storage unit
40 Banknote determining unit
50, 51, 52, 53, 54, 55, 56, 57, 58, 59 Transportation direction switching means
70 Banknote examination unit
71, 72, 73 Banknote storage box
74, 75 Banknote collection box
80, 81 Transportation direction
90 Subject banknote
91 Preceding banknote
92 Sheet sensor
93 Feed roller
94 Gate roller
95 Pickup roller
96 Pressing plate
97 Banknote
98, 99 Rubber pad
10*a*, 10*b*, 10*c*, 10*d*, 10*e*, 10*f*, 10*g*, 10*h* Transportation path
30*a*, 40*a*, 70*a*, 71*a*, 72*a*, 73*a*, 74*a*, 75*a* Transportation path
101 Automatic transaction device
102 Card/slip processing mechanism
103 Bankbook processing device
104 Coin processing device
105 Customer operating unit
106 Safe casing
107 Staff operating unit
108 External interface unit
109 Storage unit
110 Main body control unit
111 Power supply unit
112 Control unit

The invention claimed is:

1. A paper sheet handling device comprising:

a transportation path along which a paper sheet is transported;

a transportation direction switching mechanism that selectively switches a transportation direction in the transportation path; and a paper sheet handling control unit configured to:

determine a current operation speed of the transportation direction switching mechanism based on characteristics of the transportation direction switching mechanism or current operating conditions of the transportation direction switching mechanism; and change and control an operation timing of the transportation direction switching mechanism according to the determined operation speed of the transportation direction switching mechanism, wherein the paper sheet handling control unit is further configured to control at least one of a transportation speed of the paper sheet and a distance between the paper sheet and a preceding paper sheet.

2. The paper sheet handling device according to claim 1, further comprising:

a banknote feeding mechanism configured to control an interval of the paper sheets.

3. The paper sheet handling device according to claim 1, further comprising:

an operation panel with which a user can select whether the transportation speed of the paper sheet or the distance between the paper sheet and a preceding paper sheet will be controlled.

4. The paper sheet handling device according to claim 1, wherein a plurality of the transportation direction switching mechanisms are provided.

5. A paper sheet handling method for selectively switching a transportation direction of a paper sheet using a transportation direction switching mechanism, the method comprising the steps of:

determining a current operation speed of the transportation direction switching mechanism based on characteristics of the transportation direction switching mechanism or current operating conditions of the transportation direction switching mechanism;

changing and controlling an operation timing of the transportation direction switching mechanism according to the determined operation speed of the transportation direction switching mechanism; and controlling at least one of a transportation speed of the paper sheet and a distance between the paper sheet and a preceding paper sheet.

6. An automatic transaction device that transports and collects a banknote being transacted to and from a loading and unloading opening, the device comprising:

a transportation path along which the banknote is transported;

a transportation direction switching mechanism that selectively switches a transportation direction in the transportation path; and a handling control unit that:

determines a current operation speed of the transportation direction switching mechanism based on characteristics of the transportation direction switching mechanism or current operating conditions of the transportation direction switching mechanism; and changes and controls an operation timing of the transportation direction switching according to the determined operation speed of the transportation direction switching mechanism, wherein the handling control unit is further configured to control a transportation speed of the banknote and a distance between the banknote and a preceding banknote.

* * * * *